United States Patent [19]
Braun et al.

[11] 3,822,011
[45] July 2, 1974

[54] CONVEYOR TROUGH CONSTRUCTION PARTICULARLY FOR CHAIN SCRAPER CONVEYORS

[75] Inventors: Gert Braun; Ernst Braun, both of Essen-Heisingen, Germany

[73] Assignee: Halbach & Braun, Wuppertal-Bamen, Germany

[22] Filed: Jan. 12, 1973

[21] Appl. No.: 323,051

[30] Foreign Application Priority Data
Jan. 13, 1972  Germany............................ 2201400

[52] U.S. Cl. ............................................. 198/204
[51] Int. Cl. .............................................. B65j 15/60
[58] Field of Search .................................... 198/204

[56] References Cited
FOREIGN PATENTS OR APPLICATIONS
| | | | |
|---|---|---|---|
| 1,005,775 | 4/1952 | France.............................. | 198/204 |
| 1,104,158 | 3/1965 | Great Britain..................... | 198/204 |
| 570,024 | 7/1961 | Belgium............................ | 198/204 |

*Primary Examiner*—Richard E. Aegerter
*Attorney, Agent, or Firm*—McGlew and Tuttle

[57] ABSTRACT

A conveyor trough particularly for chain scraper conveyors, includes bottom walls over which the chain is advanced and side walls which are formed as trough sections which are joined together in end-to-end relationship. The trough sections have trough joining elements secured to the side walls which comprise a connecting bolt projecting outwardly from one adjacent section and a connecting claw pocket defined on the associated side wall of the other adjacent section and of a size to receive said connecting bolt therein for interengagement of said section. Each of the connecting claws and bolts are provided with raised portions or projections which extend outwardly from the side wall and define holder elements or posts. A closed loop or link is engaged over the holders and holds the two sections together.

8 Claims, 3 Drawing Figures

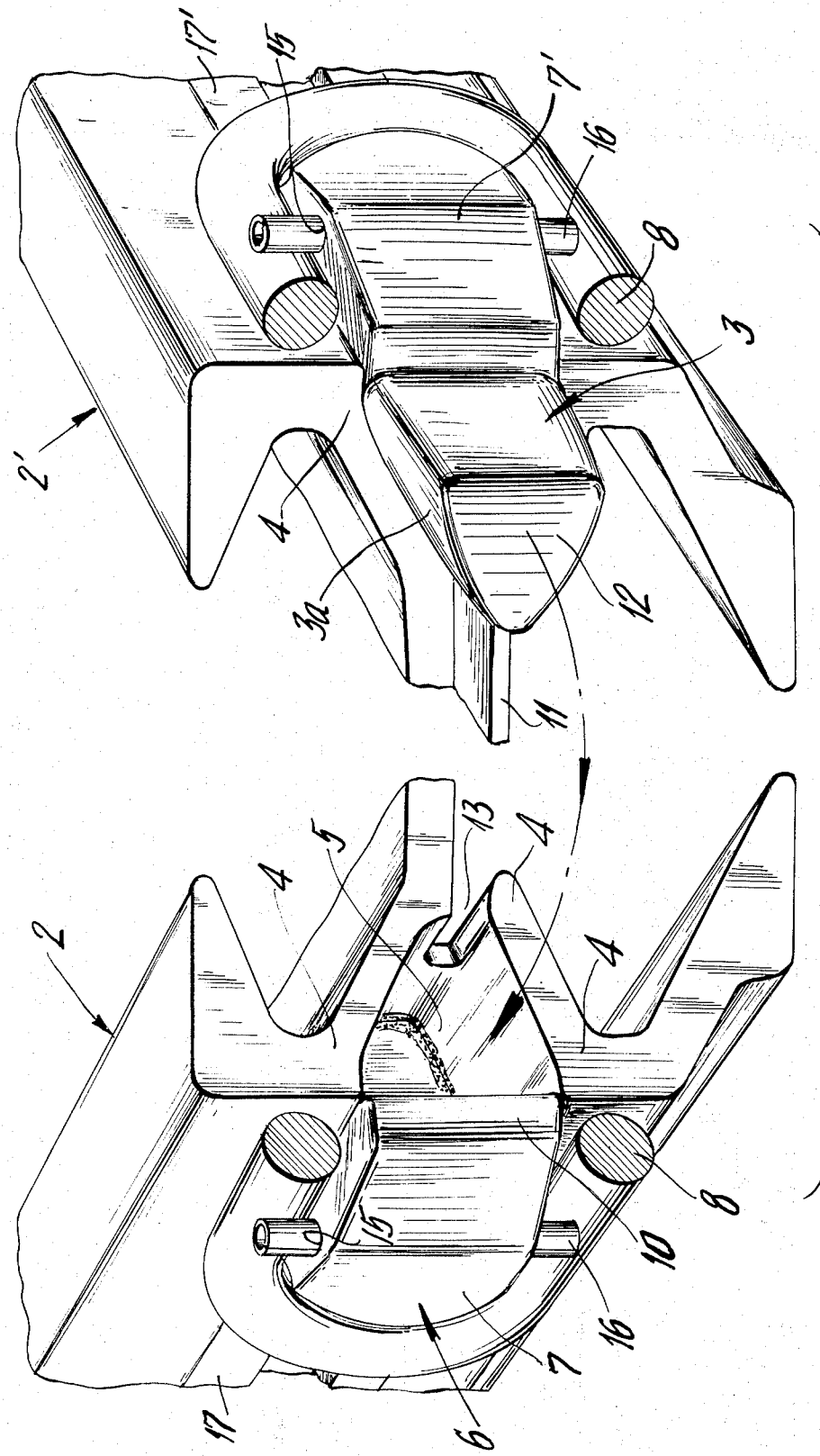

CONVEYOR TROUGH CONSTRUCTION PARTICULARLY FOR CHAIN SCRAPER CONVEYORS

BACKGROUND OF THE INVENTION

1. FIELD OF THE INVENTION

This invention relates in general to the construction of conveyors and, in particular, to a new and useful conveyor trough particularly for chain scraper conveyors which includes sections comprising side walls and scraper bottoms which have side walls formed with interengageable projecting and recessed portions on adjacent sections and with holder posts which are held together by a loop member to join the sections together.

2. DESCRIPTION OF THE PRIOR ART

Conveyor troughs, particularly for chain scraper conveyors are known in various embodiments, particularly those which comprise a plurality of trough sections which are joined in end-to-end relationship by means of trough-joining elements secured thereto. In conveyor troughs of this type, the trough-joining elements are designed as screw bolt joints which permit a certain play between the trough sections. However, such screw bolt joints are only suitable to a limited extent to absorb bending, tensile or compressive stresses as well as shearing stresses which occur particularly during the advance of the conveyor trough due to the play existing between the trough sections. In the course of the advance, considerable forces act in great intervals on the conveyor trough, so that the conveyor trough sections frequently advance unevenly and bend off. When this happens, the screw bolt joints between adjacent trough sections frequently burst off or tear off or become deformed. After the conveyor trough has advanced, therefore, a majority of the screw bolt joints must be replaced or repaired. This requires much time, energy and material and leads to an undesired downtime of the conveyor. In many instances, an adequate repair of the joints is not made so that a satisfactory connection between the individual trough sections is no longer ensured. The same drawbacks occur if the trough joining elements are designed as sprocket chain links or similar connections.

SUMMARY OF THE INVENTION

In accordance with the invention, there is provided a conveyor trough construction, particularly for chain scraper conveyors, in which individual sections of the trough are joined together so that they can readily absorb the bending and shearing stresses which occur in the course of the advance of the conveyor trough and still permit the necessary play between the trough sections.

The inventive conveyor, which is particularly for chain scraper conveyors, comprises individual trough sections which are joined together by joining elements which are secured to adjacent ends thereof. The joining elements include a connecting bolt or projecting part on one member and a connecting claw defining a receiving pocket on the other member into which the bolt may extend. Each of the connecting parts include raised projections defining holders which project outwardly from the side walls. The holders are engaged by a surrounding loop member or link which is advantageously locked in position by cross-pins which extend over the link after it is in place. With the construction, the conventional screw bolt joint may be eliminated and a bolt joint is obtained wherein a connecting bolt bears on both sides of the conveyor trough in a connecting pocket acting in a transverse direction and also against the side wall of the adjacent trough section adjacent the associated connecting pocket. This provides a joint between the connecting bolt and the connecting pocket which permits the necessary play between the trough sections. In addition, a bilateral transmission or absorption of forces is achieved according to the invention because the connecting bolt, which is arranged in the connecting pocket, cannot yield in a transverse direction. This is enhanced by welding the connecting bolts and the connecting pocket-forming member to the associated plates of the conveyor. The interfitting connecting bolt and receiving pocket of the connecting parts provide additional lateral stability and increased support particularly against transverse stresses.

In accordance with a feature of the invention, the side wall portions of the conveyor trough sections are formed with conical end faces so that the connecting bolts of each section can be readily introduced into the receiving pockets of the adjacent section even in the event that the connecting pocket should be dirty. In addition, in order to guard against the collection of dirt, the invention provides a side wall with dirt outlet openings in the range of the connecting pockets. During operation, the constant interworking of a connecting bolt in the pocket caused by any play existing between the two sections, ensures that any accumulation of dirt in the pocket will be forced out through the dirt outlet openings. This provides a self-cleaning effect. Preferably, the projections are designed as noses which extend laterally of the trough sections which engage into complimentarily formed recesses of the adjacent pocket connecting parts. The walls bounding the receiving recesses engage the pojections from respective opposite sides.

Each of the connecting parts form projections which extend outwardly from a side wall and define posts or holders and a connecting member in the form of a chain link of a rounded link chain is engaged over the respective outer opposite ends of the holders to hold the two sections together. The projections are provided with vertical bores to receive locking pins which extend over the adjacent connecting link at the top and bottom of the projections and prevent the withdrawal thereof. By forming the connecting parts of each section with the projections which form holders, the parts can be arranged in a minimum of space and without changing the dimensions of the associated parts.

The present invention is particularly advantageous for chain scraper conveyors where the trough joining elements are designed so that they are capable of absorbing bending stresses and tensile and compressive stresses resulting therefrom and also shearing stresses as they occur in the course of the advance of the conveyor trough between the unevenly advanced trough sections. Due to the interraction between the connecting bolts and the connecting pockets, the trough joining elements permit an absorption of forces which is much higher than the present screw bolt joints or similar joints. In addition, the play necessary between the adjacent trough sections is maintained so that the trough joining elements finally lead, according to the teaching of the invention, to a conveyor trough which is characterized by a particularly simple, stable and therefore reliable construction.

Accordingly, it is an object of the invention to provide a conveyor trough, particularly for chain scraper conveyors, which comprises a plurality of trough sections joined with each other in end-to-end relationship and each having side walls with trough joining elements secured thereto and which comprise a connecting bolt projecting outwardly from one adjacent section and a connecting claw pocket defined on the associated side wall of the other section of a size to receive the connecting bolt, and wherein said connecting bolt and said connecting claw have projections which define holders projecting outwardly from the side of said sections and a closed loop engaged around the respective opposite outer ends of said holders.

A further object of the invention is to provide a conveyor trough which is simple in design, rugged in construction, and economical to manufacture.

For an understanding of the principles of the invention, reference is made to the following description of a typical embodiment thereof as illustrated in the accompanying drawings.

BRIEF DESCRIPTION OF THE DRAWINGS

In the Drawings:

FIG. 3 is a separated perspective view indicating two conveyor trough sections with their connecting elements.

GENERAL DESCRIPTION OF THE PREFERRED EMBODIMENT

Figure 1:
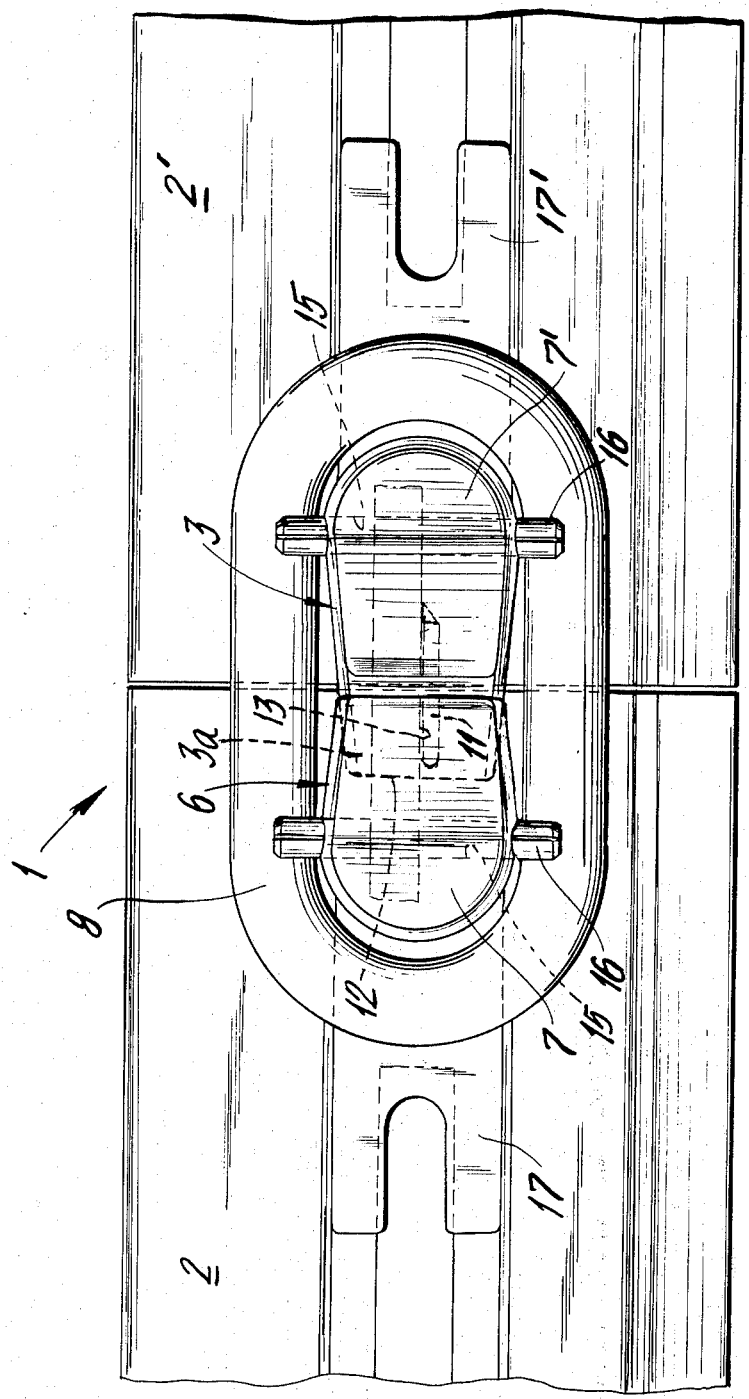
FIG. 1 is a side elevational view of a conveyor trough constructed in accordance with the invention.

Referring to the drawings in particular, the invention embodied therein, comprises the two conveyor trough, generally designated 1, particularly for chain scraper conveyors, which comprises a plurality of individual trough sections 2, 2', etc. The sections 2 and 2' are arranged in end-to-end relationship and each section advantageously includes an end with a connecting part or joining element, generally designated 3 thereon and an opposite end with a connecting part or element, generally designated 6.

In accordance with the invention, the connecting part 3 includes a bolt or projection 3a which engages into a recess or pocket 5 of the connecting part 6. A feature of the construction is that the connecting part 6 includes a projection 7 defining a holder post and the connecting part 3 includes a projection 7' defining a holder or post. A loop member or chain link element 8 is engaged over the holders 7 and 7' and around the opposite outer ends thereof to hold the chain sections 2 and 2' together after the bolt part 3a is engaged into the pocket recess 5.

Figure 2:
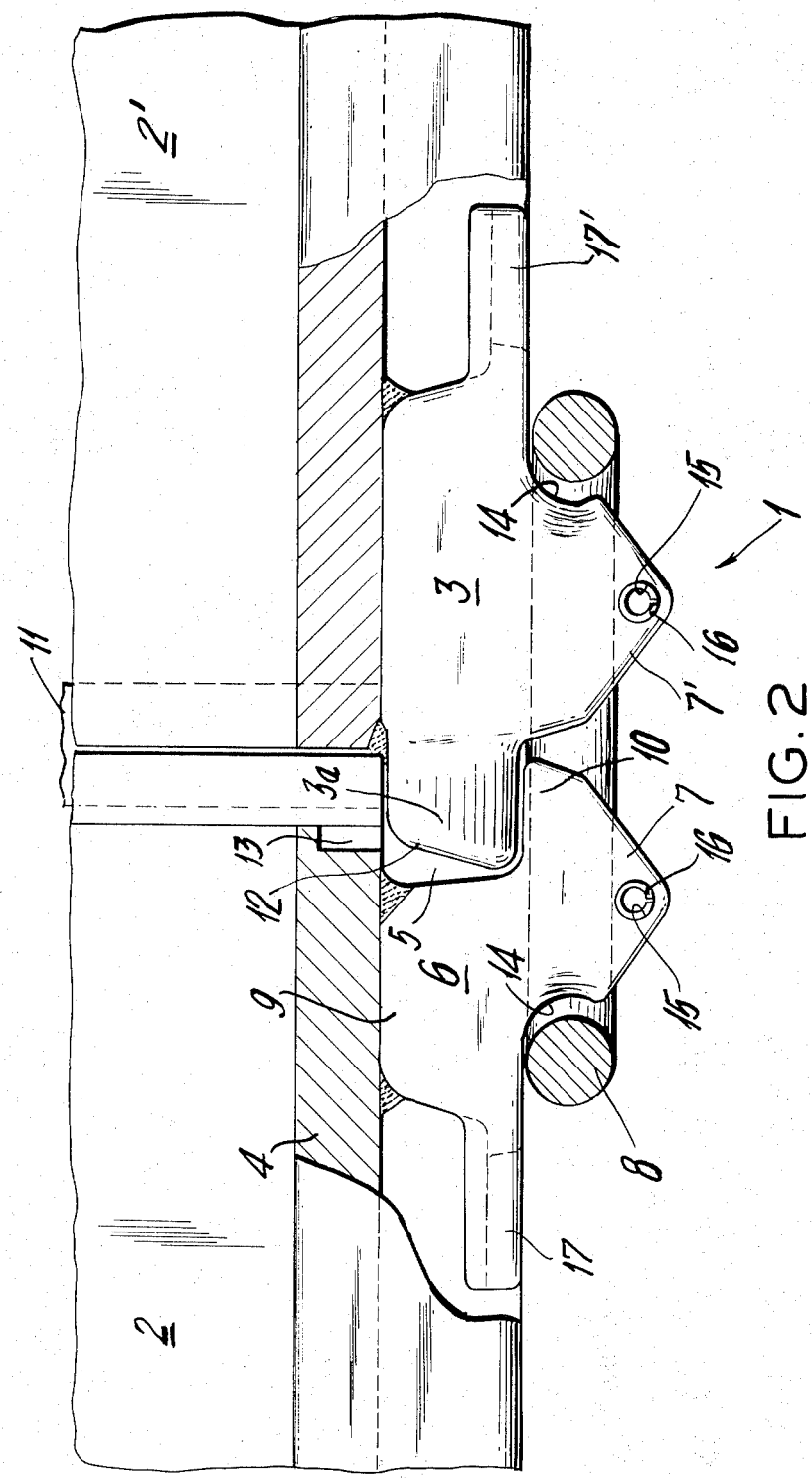
FIG. 2 is a top plan view partly broken away of the conveyor trough shown in FIG. 1.

The connecting part 6 may be considered to be a substantially Z-shaped connecting body, as shown in plan in FIG. 2, with one side 9 bearing against a side wall 4 of the associated trough section 2 and the other side 10 forming with the side wall a connecting pocket 5 into which the respective connecting bolt portion 3a engages so that the side 10 overlaps the connecting bolt 3. Both the connecting part 3 and the connecting part 6 are welded to the side walls 4 of the associated trough sections 2 and 2'. The connecting member 8 is designed as a link of a round link chain. The connecting part 3, as shown in FIG. 2, is welded to the associated underlapping plates 11 of the trough section 2'.

The insert ends of the connecting bolts 3a are provided with conical end faces 12. Each recess is provided with a longitudinally elongated slot or opening 13 for the outlet of dirt. The connecting bolt part 3a is provided with a longitudinally elongated projection 11 which engages into the slot 13 and works within the slot during operation of the device and movement thereof to disengage dirt from the recess 5.

The projections 7 and 7' are advantageously designed as noses which project laterally of the trough sections 2 and 2' and which have bearing recesses 14 for receiving the link 8. In addition, the projections have through bores 15 which, in the embodiment shown, are vertical bores which receive locking pins or clamping sleeves 16. Each connecting part 3 and 6 is provided with projection 17 and 17', respectively, which form bracket holders.

While a specific embodiment of the invention has been shown and described in detail to illustrate the application of the principles of the invention, it will be understood that the invention may be embodied otherwise without departing from such principles.

What is claimed is:

1. A conveyor trough particularly for a chain scraper conveyor, comprising a plurality of trough sections joined together in end-to-end relationship, each having side walls with trough joining elements secured thereto, said trough joining elements comprising a connecting bolt projecting outwardly in a first direction from one adjacent section and a connecting claw having an end opening receiving pocket defined on the associated side wall of the other section of a size to receive said connecting bolt, said connecting bolt and said connecting claw including an outwardly projecting portion defining a holder extending outwardly in a second direction from the side of the associated section, and a closed loop link engaged around the respective opposite outer ends of said holders.

2. A conveyor trough, according to claim 1, wherein said connecting claw pocket is formed as a portion of a side wall of the associated section, said side wall having a dirt outlet slot extending into said pocket.

3. A conveyor trough, according to claim 1, wherein said connecting bolt has a conical end face.

4. A conveyor trough, according to claim 1, wherein said sections include a plate underlying the associated trough joining element, said trough joining element being welded to said plate.

5. A conveyor trough, according to claim 1, wherein said projections defining said holders have a bore therethrough, and a holding pin extending through said bore and overlapping the exterior of said link.

6. A conveysr trough, according to claim 5, wherein said projections include wall portions adjacent the associated section side walls forming recesses in which said link is engaged.

7. A conveyor trough, according to claim 1, wherein said side walls include laterally extending portions extending beyond said holders defining bracket supports.

8. A conveyor trough, particularly for chain scraper conveyors, comprising first and second interengageable sections arranged in end-to-end relationship, each section including a substantially vertical side wall and with a laterally extending bottom, one of said sections having an end face with a longitudinally extending pocket defined therein, the other of siid sections having a projecting bolt extending outwardly from the end face and into the receiving pocket of the other section, a projection formed on the exterior wall of each section with at least one projection having a trough bore therethrough, and a link member extending around the projection of each section and holding said sections together, and a removable pin engaged through said bore of said projection and overlying said link to hold said link in position.

* * * * *